United States Patent [19]

Stone, Jr.

[11] Patent Number: 4,638,929
[45] Date of Patent: Jan. 27, 1987

[54] INJECTION MOLDED, SELF SEALING TOP ASSEMBLY FOR OPEN MOUTH COFFEE POTS

[75] Inventor: Wayne B. Stone, Jr., Bethesda, Md.

[73] Assignee: Wood Manufacturing Co., Inc., Flippin, Ark.

[21] Appl. No.: 598,767

[22] Filed: Apr. 10, 1984

Related U.S. Application Data

[63] Continuation-in-part of Ser. No. 532,980, Sep. 16, 1983.

[51] Int. Cl.⁴ .............................................. G01F 11/26
[52] U.S. Cl. ..................................... 222/456; 220/378
[58] Field of Search ............... 222/464, 481, 156, 157, 222/456, 454, 566; 99/275; 220/205, 361, 378; 215/234, 259

[56] References Cited

U.S. PATENT DOCUMENTS

| | | | |
|---|---|---|---|
| 1,601,723 | 10/1926 | Elbert | 222/456 |
| 2,348,293 | 5/1944 | Hamer | 220/378 |
| 3,130,852 | 4/1964 | Cook | 220/378 |
| 3,215,304 | 11/1965 | Rohe | 220/378 |
| 4,171,075 | 10/1979 | Gangwisch | 222/456 |
| 4,361,257 | 11/1982 | Stone, Jr. | 222/464 |
| 4,443,016 | 4/1984 | Schungel | 220/378 |

Primary Examiner—Joseph J. Rolla
Assistant Examiner—Kenneth Noland
Attorney, Agent, or Firm—Banner, Birch, McKie & Beckett

[57] ABSTRACT

The purpose of the invention is to form, from two injection molded parts, a self sealing top assembly for an imperforate walled, open mouth coffee pot.

2 Claims, 9 Drawing Figures

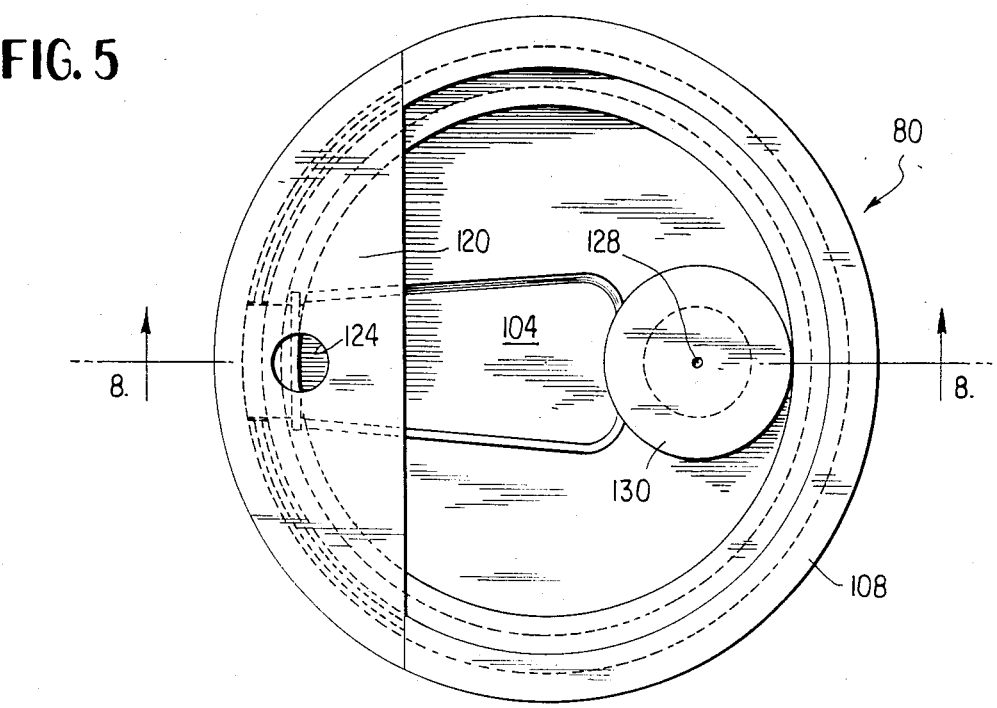
FIG. 5
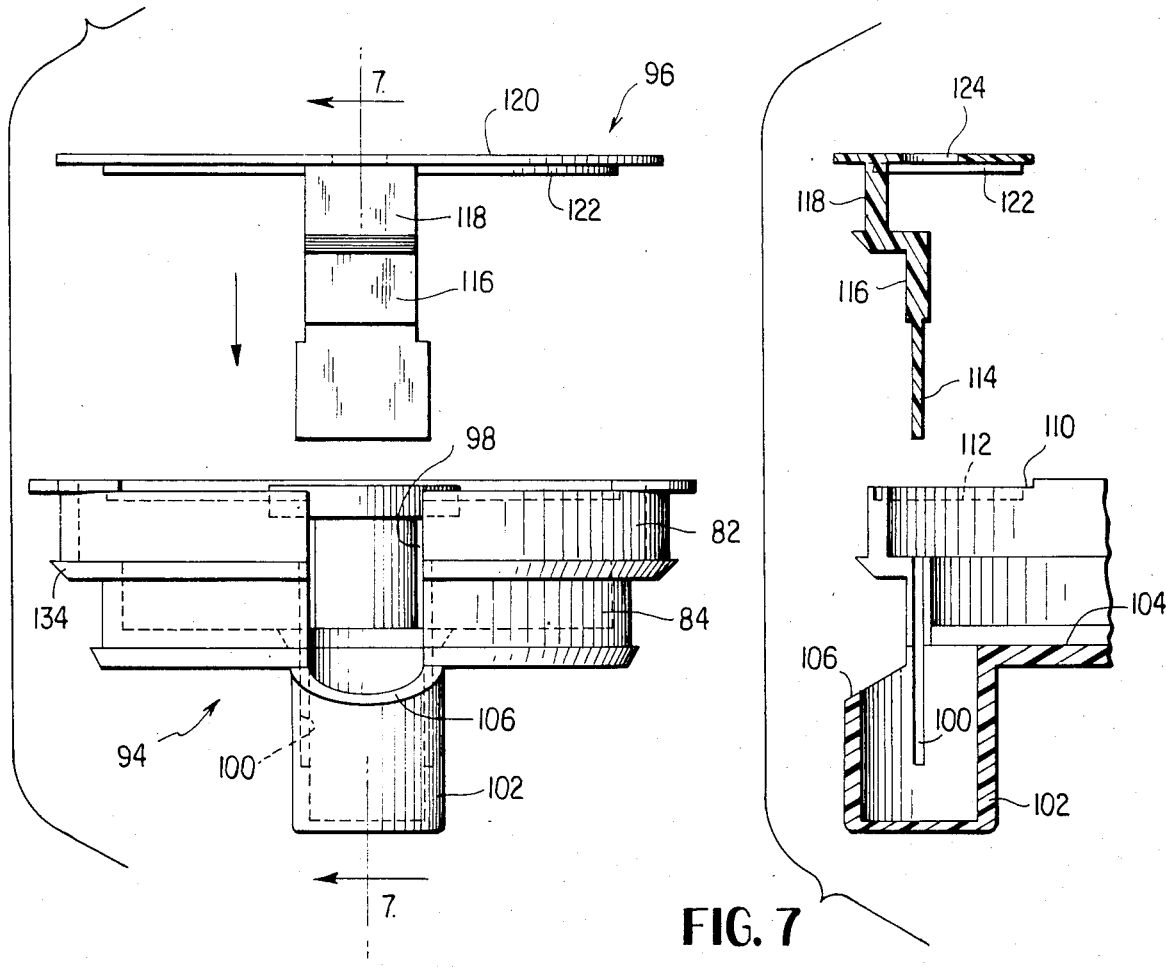
FIG. 6
FIG. 7

4,638,929

INJECTION MOLDED, SELF SEALING TOP ASSEMBLY FOR OPEN MOUTH COFFEE POTS

CROSS-REFERENCE TO RELATED APPLICATION

This is a continuation-in-part of application Ser. No. 532,980, entitled "Self Sealing Top Assembly for Open Mouth Coffee Pots; filed Sept. 16, 1983.

BACKGROUND OF THE INVENTION

In the aforesaid co-pending application is disclosed a top assembly for an open mouth coffee pot having flow passage means extending therethrough and wherein the flow passage means includes a liquid trap. The purpose of the liquid trap is to retain a volume of coffee therein to act as a liquid seal in preventing atmospheric contact with the pot contained coffee; all as more specifically disclosed in the aforesaid copending application. One of the simpler forms the liquid trap may assume is a hook-shaped, or "J" shaped, tube as illustrated in FIGS. 3 and 5 of the aforesaid copending application. The top assemblies shown in the aforesaid FIGS. 3 and 5 may be made by joining a bent tube with the remainder of the top assembly as by sonic welding, adhesives or the like.

The problem arises in connection with mass production requirements. The entire top assembly cannot be injection molded as a single part because of the required J bend to form the liquid trap. Consequently, the J-shaped tube must be formed separately and subsequently joined to the remainder of the top assembly. The J-shaped tube, too, cannot be molded as a single piece because the required radius of curvature, to retain the liquid seal, is such that cooperating tool parts cannot make the necessary convergence. Thus, the J bend would have to be formed in two halves and then joined to form the J tube. Similarly, it would be possible to bend drawn tubing into a J shape while it is still hot, but it is still required that the J tube be joined to the remainder of the top assembly.

In any of the above events, a joining step is required. Because of the environment in which the top assembly is used, the plastics that may be employed are limited to those which will meet FDA requirements for hot food contact. Among the available choices only polypropylene offers a significant cost advantage since it is about one-third the price of the next most inexpensive plastic that may be used, such as polycarbonate, for example. Unlike most other plastics, polypropylene cannot be joined by welding, glueing or any other known manner of joining most plastics.

It is, therefore, the purpose of the invention to produce a top assembly having a J-shaped liquid trap from two injection molded parts that need be only mechanically interfitted as opposed to a permanent joining.

SUMMARY OF THE INVENTION

A liquid holding well is formed integrally with a first top subassembly which is received within the open mouth of a coffee pot. The first top subassembly has a floor onto which coffee from an overlying automatic drip coffee maker flows. The floor is continuous with, and in gravity flow relation to, the upper end of a first peripheral portion of the well bounding wall. The upper end of a second peripheral portion of the well bounding wall terminates below the level of the floor to define an overflow weir for coffee flowing across the floor and into the well.

The second subassembly part includes a pour spout and a divider wall which interfits with the first subassembly and bridges the bounding wall of the well to separate the overflow weir portion of the well from that portion of the well wall continuous with the floor of the first subassembly part. The lower end of the divider wall terminates above the bottom of the well but below the overflow weir. The result is that following mechanical interfitment of the parts a J-shaped liquid trap is formed within the confines of the liquid holding well.

In a first embodiment, the top assembly is sized to interfit with the open mouth of a particular size coffee pot while a second embodiment is sized to, selectively, interfit with the open mouth of either of two other size coffee pots.

DESCRIPTION OF THE DRAWINGS

The drawings are full scale.

FIG. 5 is a top plan view of a second embodiment of the self sealing top assembly;

FIG. 6 is an exploded, front elevation of the top assembly shown in FIG. 5;

FIG. 7 is an exploded, vertical section of the top assembly of FIG. 5;

DESCRIPTION OF THE PREFERRED EMBODIMENTS

Figure 1:
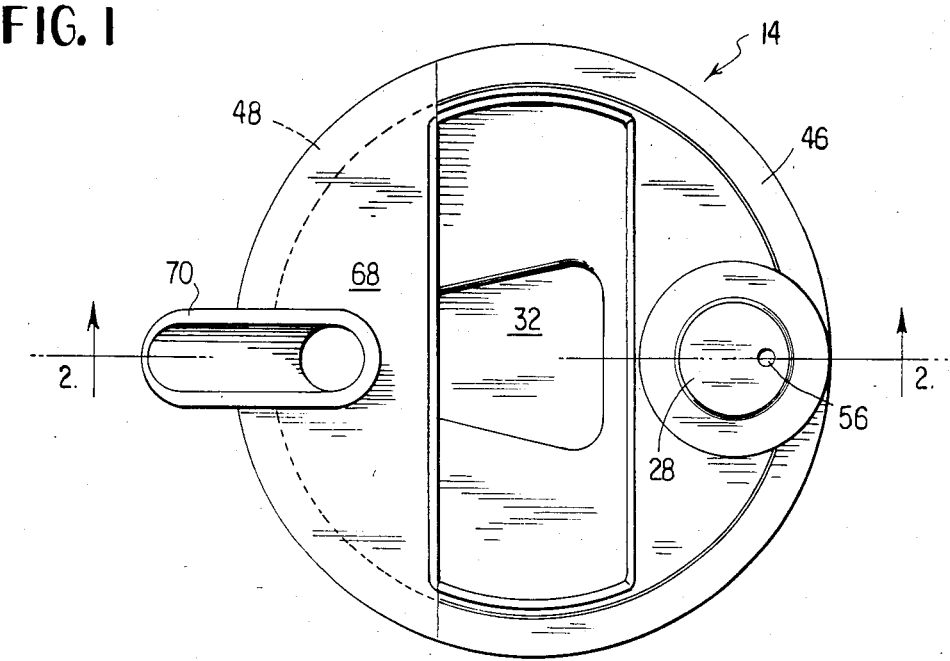
FIG. 1 is a top plan view of a first embodiment of a self sealing top assembly.
Figure 2:
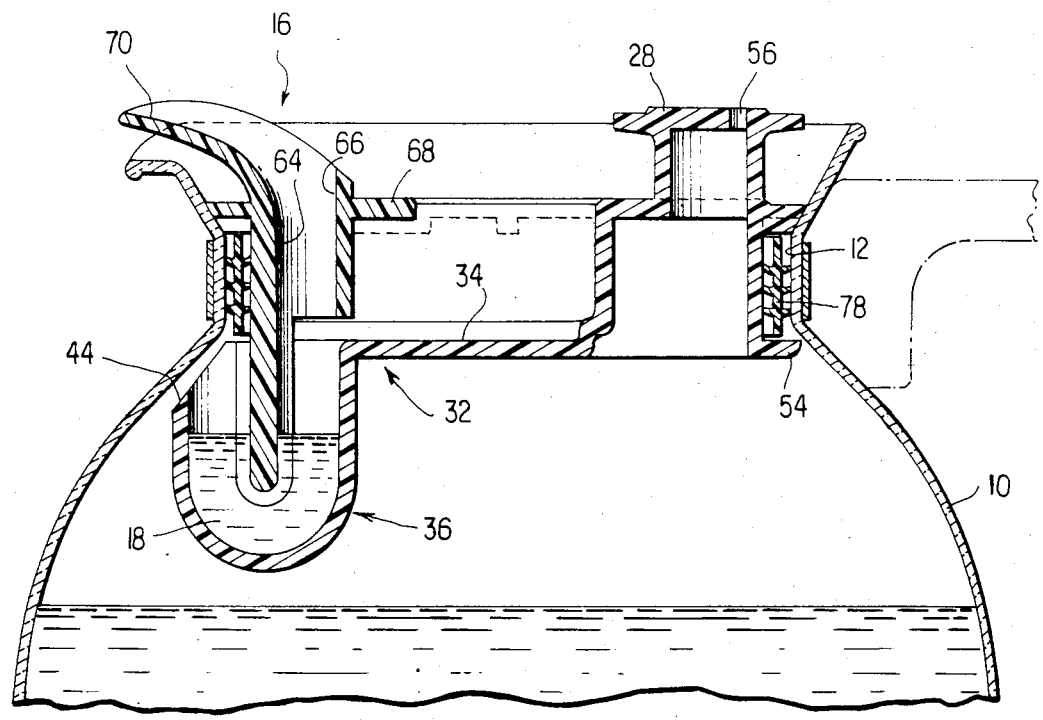
FIG. 2 is a sectional view taken along the line 2—2 of FIG. 1 and illustrating the top assembly in sealing relation to the open mouth of a coffee pot.

In FIG. 2 is illustrated a coffee pot 10 whose open mouth 12 is substantially sealed by a top assembly 14 having flow passage means 16 extending therethrough and including a J-shaped liquid trap 18.

Figure 4:
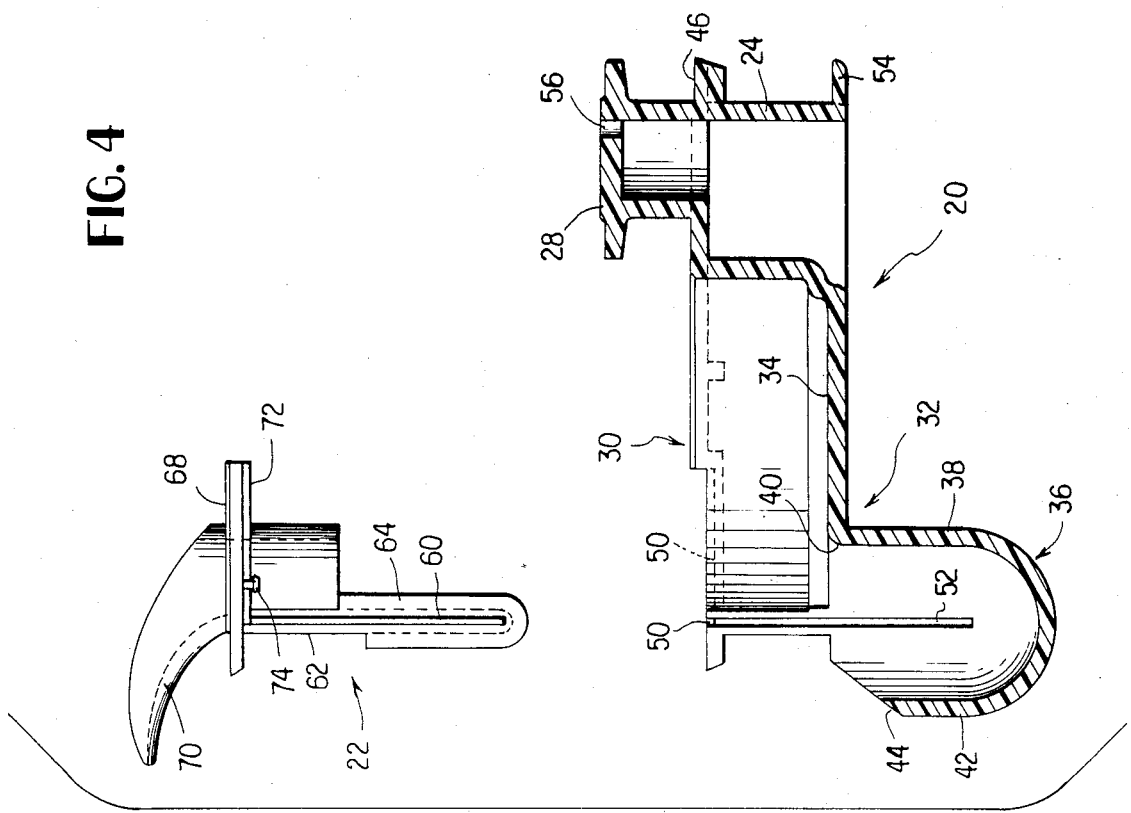
FIG. 4 is an exploded view of the top assembly with one part shown in side elevation and the other in vertical section.
Figure 3:
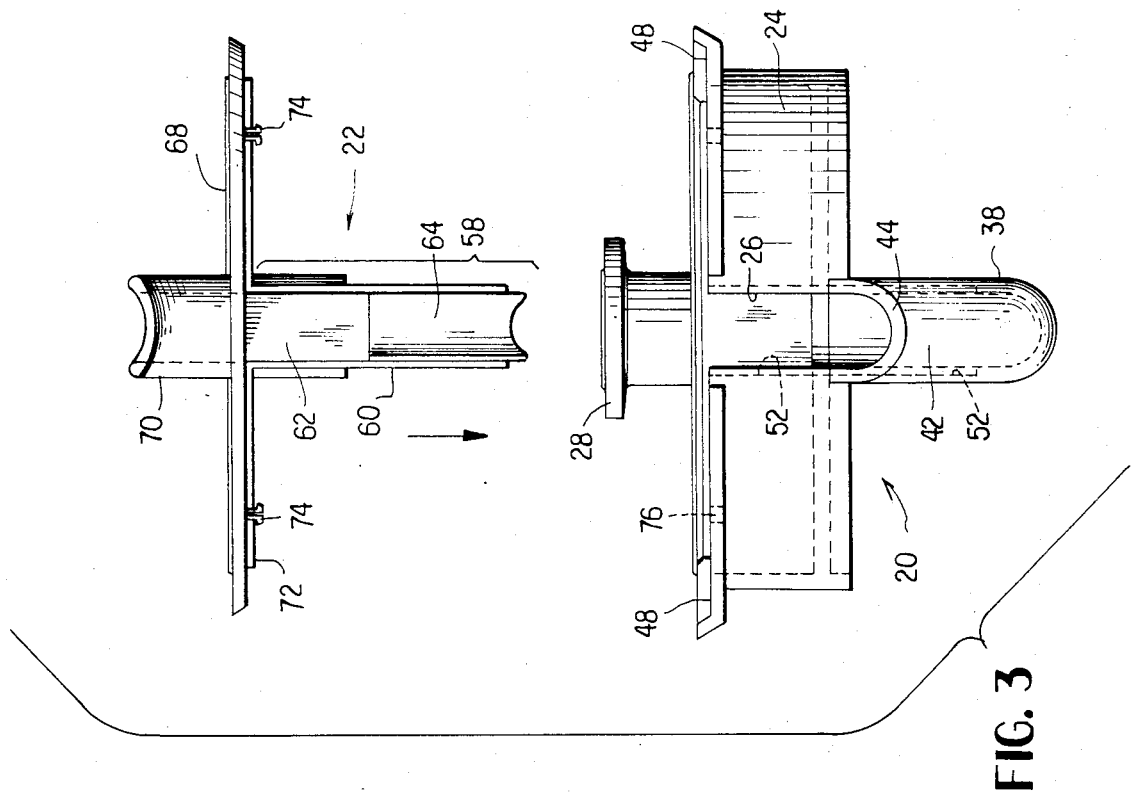
FIG. 3 is an exploded, front elevation of the top assembly.

Top assembly 14 is formed from two, mechanically interfitted, injection molded parts 20, 22 (see FIGS. 3 and 4). The larger, insert part 20 interfits with the open mouth of a coffee pot while the smaller, flow control part 22 interfits with the insert 20.

The insert portion 20 includes an outer cylindrical wall portion 24 which is discontinuous on the front, pouring side thereof at gap 26. A finger grip knob 28 is formed on the back side of insert 20 opposite gap 26. Insert 20 is internally formed to define a coffee receiving recess 30 having a bottom wall 32 comprising a floor 34 and a liquid holding well 36. The well bounding wall 38 has one upper peripheral portion 40 thereof formed integrally with floor 34, in gravity flow relation thereto, and the other upper peripheral portion 42 thereof terminated below the level of floor 34 to form an overflow weir 44. The coffee receiving recess 30 is surmounted by an outurned rim 46 which is stepped at 48 along the front part thereof on either side of gap 26. The stepped portion 48 of the rim is formed with a groove 50 in the upper surface thereof. Similar grooves 52 are formed in opposite sides of well bounding wall 38 at the juncture of the upper peripheral well bounding wall portions 40 and 42. A small tongue 54 extends rearwardly from the lower, back side of cylindrical surface 24. The tongue is sized to flex upon insertion of the top assembly into a coffee pot to interlock with the pot wall, as shown in FIG. 2, below open mouth 12. The top assembly is vented through knob 28 as by a vent hole 56 having a diameter on the order of ⅛ inch.

The flow control part 22 has a lower, divider wall portion 58 having opposed ridges 60 adapted for sliding, interfitting engagement with grooves 52. The upper end of divider wall 58 is formed on a front surface 62 with a convex configuration which is complimentary to that of cylindrical wall portion 24 so that, when the parts are interfitted, gap 26 is bridged by divider wall surface 62. The upper end of the divider wall 58, on the back surface 64 thereof, is continuous with opening 66, extending through apron 68, and a pour spout 70. Apron 68 is formed on the lower surface thereof with an arcuate ridge 72 adapted to interfit with groove 50 when apron 68 is seated on step portion 48. Flexible locking tabs 74 extend downwardly from apron 68 to interlock with openings 76 in the step portion 48 of insert rim 46.

Top assembly 14 is sealed with respect to open mouth 12 by gasket 78 engaging wall surfaces 24 and 62 of the insert part 20 and flow control part 22.

In operation, coffee flowing into recess 30 from an overlying, automatic drip coffee maker, flows across floor 34, into well 36, beneath divider wall 58 and over weir 44 into pot 10. Initial coffee inflow establishes the liquid trap 18 illustrated in FIG. 2. The liquid trap is, of course, maintained as coffee is dispensed from the pot. Thus upon tipping the pot 10 to dispense coffee, the coffee flow path is from the interior of pot 10, across weir 44, beneath divider wall 18, along divider back wall 64 and out pour spout 70. Apron 68 acts to confine the outgoing flow path to pour spout 70.

From the foregoing, it is apparent that a liquid trap is maintained at 18, from initial coffee inflow to the pot until the last cup is dispensed from the pot.

The top assembly 80, shown in FIGS. 5-9, is formed with two cylindrical surfaces 82, 84 which are adapted to, selectively, interfit with either of two different pots 86, 88 having open mouths 90, 92 of different diameters.

As in the embodiment of FIGS. 1-4, the top assembly is formed from two injection molded parts; an insert part 94 and a flow control part 96.

Cylindrical surfaces 82, 84 are discontinuous at gap 98. Grooves 100 are formed in the side walls of that portion of gap 98 aligned with cylindrical surface 84 and extend down into well 102 to terminate below floor 104 and weir 106. Rim 108 is stepped at 110 and formed with an arcuate groove 112 on the upper surface thereof.

Flow control part 96 has a lower divider wall portion 114 whose opposite sides are sized to slidingly interfit with grooves 100. Extending upwardly from divider wall 114 are stepped, convex surfaces 116, 118 which are, respectively, complimentary to cylindrical surfaces 84, 82. Apron 120 seats in step 110 and includes arcuate ridges 122 to interfit with groove 112. A pour opening 124 extends through the front part of apron 120.

Figure 8:
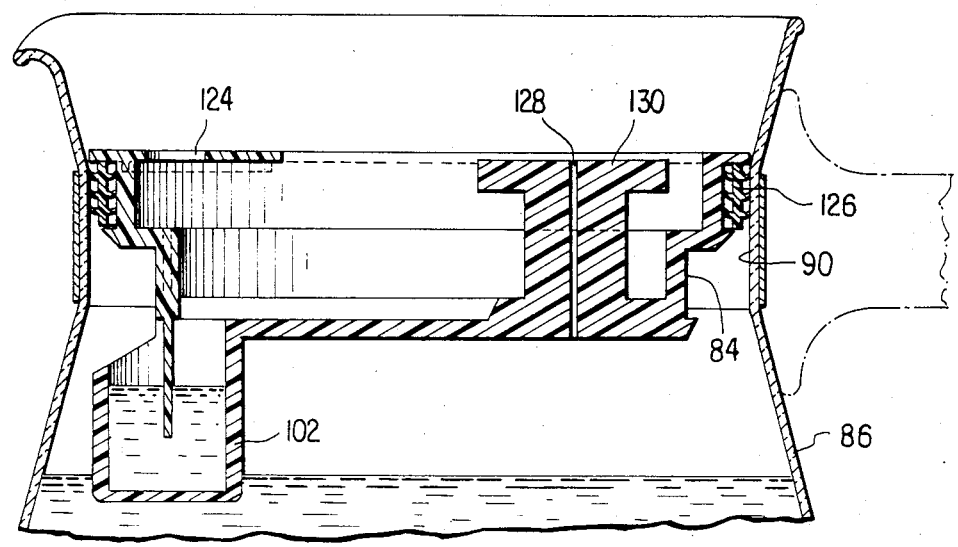
FIG. 8 is a vertical section of the top assembly shown in FIG. 5 and illustrated as being interfitted with a coffee pot having an open mouth of a particular size.

When the top assembly is to be used with a large mouth coffee pot such as shown in FIG. 8, a gasket 126 is placed around surfaces 82 and 118 to seal the pot contained coffee with respect to atmosphere except for the small vent opening 128 extending through knob handle 130 across which a vapor seal is maintained by the vapor pressure of the pot contained coffee.

Figure 9:
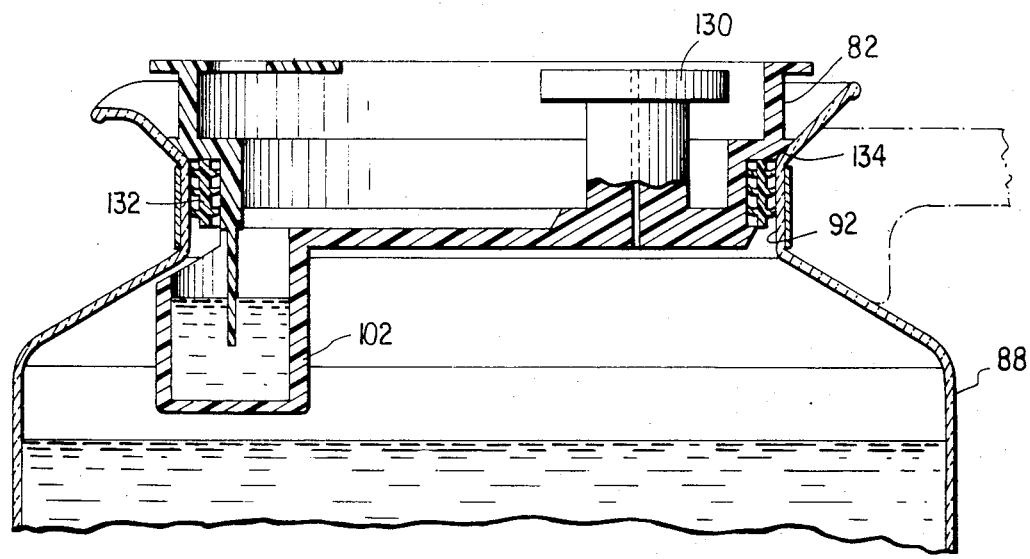
FIG. 9 illustrates the top assembly of FIG. 5 as being interfitted with a coffee pot having an open mouth size smaller than that of the coffee pot shown in FIG. 8.

When used with a smaller mouthed coffee pot, as shown in FIG. 9, a smaller diameter gasket 132 surrounds the surfaces 84 and 116.

Top assembly 80 is inserted into pot 88, for example, by gripping knob 130 and tilting the assembly downwardly so that well portion 102 underlies open mouth 92 whereafter the backside of the assembly is pressed downwardly until flange 134 bottoms on the pot above that portion of open mouth 92 sealed by gasket 132.

The top assembly shown in FIGS. 5-9 functions in the same manner as that previously described, except that the exit pour of coffee from the pot is directly from the opening 124 in apron 120 rather than along an elongate pour spout as in the first embodiment.

I claim:

1. A top assembly for an open mouth coffee pot through which coffee is introduced from the exterior of a pot to the interior thereof and subsequently dispensed from the interior of a pot externally thereof; said top assembly having liquid flow passage means extending therethrough; said flow passage means including a liquid trap for retaining a volume of coffee therein following the introduction of coffee therethrough into a coffee pot and for retaining a volume of coffee therein following the dispensing of coffee therethrough from a coffee pot; said top assembly including two injection molded parts; the first of said parts having a bottom wall comprising a floor and a liquid holding well continuous therewith, in gravity flow relation, along a first peripheral portion of the well bounding wall; a second peripheral portion of said well bounding wall terminating below the level of said floor to define an overflow weir for liquid flowing from said floor into said well; the second of said parts being interfitted with said first part to define said liquid trap; said second part including a divider wall bridging said well and separating said first and second peripheral portions of said well bounding wall; said divider wall extending from a level above the floor of said first part down into said well and terminating below the level of said floor and above the bottom of said well whereby liquid will gravity flow from said floor across said first peripheral portion of the well bounding wall, down to the bottom of the well, beneath the lower end of the divider wall and across the overflow weir; seal means for sealing said top assembly with respect to the open mouth of a coffee pot; and restricted vent means opening on opposite sides of said seal means.

2. In combination with an imperforate walled coffee pot having an open mouth; a top assembly sealed with respect to said open mouth having restricted vent means and flow passage means extending therethrough including a liquid trap; said top assembly including two separate, integrally formed parts; the first of said parts having a bottom wall comprising a floor and a liquid holding well continuous therewith, in gravity flow relation, along a first peripheral portion of the well bounding wall; a second peripheral portion of said well bounding wall terminating below the level of said floor to define an overflow weir for liquid flowing from said floor into said well; the second of said parts being interfitted with said first part to define said liquid trap; said second part including a divider wall bridging said well and separating said first and second peripheral portions of said well bounding wall; said divider wall extending from a level above the floor of said first part down into said well and terminating below the level of said floor and above the bottom of said well whereby liquid will gravity flow from said floor across said first peripheral portion of the well bounding wall, down to the bottom of the well, beneath the lower end of the divider wall and across the overflow weir and into the coffee pot.

* * * * *